United States Patent
Monachino et al.

(10) Patent No.: US 7,310,442 B2
(45) Date of Patent: Dec. 18, 2007

(54) SCENE ANALYSIS SURVEILLANCE SYSTEM

(75) Inventors: Cheryl A. Monachino, Endicott, NY (US); Rosemary D. Paradis, Vestal, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 749 days.

(21) Appl. No.: 10/612,781

(22) Filed: Jul. 2, 2003

(65) Prior Publication Data

US 2005/0002561 A1 Jan. 6, 2005

(51) Int. Cl.
*G06K 9/62* (2006.01)
*H04N 5/225* (2006.01)

(52) U.S. Cl. ...................... 382/156; 348/169

(58) Field of Classification Search ............... 382/156, 382/284, 294, 159, 103; 348/143, 157, 588, 348/159, 222.1, 207.99; 463/16, 42, 20, 463/25; 340/323 R, 567, 941, 988, 565; 164/460, 481; 702/57, 62

See application file for complete search history.

(56) References Cited

U.S. PATENT DOCUMENTS

| | | | |
|---|---|---|---|
| 4,839,631 A * | 6/1989 | Tsuji ......................... | 340/541 |
| 5,424,773 A | 6/1995 | Saito | |
| 5,448,484 A | 9/1995 | Bullock et al. | |
| 5,613,039 A | 3/1997 | Wang et al. | |
| 5,627,942 A | 5/1997 | Nightingale et al. | |
| 5,761,326 A | 6/1998 | Brady et al. | |
| 5,842,194 A | 11/1998 | Arbuckle | |
| 5,850,470 A | 12/1998 | Kung et al. | |
| 5,859,925 A | 1/1999 | Yaeger et al. | |
| 5,870,138 A | 2/1999 | Smith et al. | |
| 5,937,092 A | 8/1999 | Wootton et al. | |
| 5,969,755 A | 10/1999 | Courtney | |
| 5,969,772 A | 10/1999 | Saeki | |
| 6,008,866 A | 12/1999 | Komatsu | |
| 6,037,986 A | 3/2000 | Zhang et al. | |
| 6,081,206 A | 6/2000 | Kielland | |
| 6,097,429 A | 8/2000 | Seeley et al. | |
| 6,141,433 A | 10/2000 | Moed et al. | |
| 6,208,758 B1 | 3/2001 | Ono et al. | |
| 6,208,983 B1 | 3/2001 | Parra et al. | |
| 6,289,135 B1 | 9/2001 | Declerck et al. | |
| 6,298,090 B1 | 10/2001 | Challapali et al. | |
| 6,323,897 B1 | 11/2001 | Kogane et al. | |

(Continued)

OTHER PUBLICATIONS

"A New Foreground Extraction Scheme for Video Streams", Zhengping Wu & Chun Chen, Dept. of Computer Science, College of Information Science & Engineering, Zhejiang University, Sep. 30-Oct. 5, 2001.

(Continued)

*Primary Examiner*—Sheela Chawan
(74) *Attorney, Agent, or Firm*—Tarolli, Sundheim, Covell & Tummino LLP

(57) ABSTRACT

A method and computer product is disclosed for analyzing video surveillance data from a plurality of video inputs recording entrants to a secured location. A plurality of entrant profiles are constructed, detailing typical attributes of the entrants, via data mining algorithms. Video inputs are analyzed, with a plurality of independent automated decision-making systems each determining if an abnormal condition exists based upon the constructed profiles. The determinations of the plurality of decision-making systems are then processed to determine if an alarm condition exists.

20 Claims, 3 Drawing Sheets

U.S. PATENT DOCUMENTS

| | | |
|---|---|---|
| 6,326,160 B1 | 12/2001 | Dunn et al. |
| 6,335,976 B1 | 1/2002 | Belmares |
| 6,774,905 B2 * | 8/2004 | Elfving et al. .............. 345/581 |
| 6,829,391 B2 * | 12/2004 | Comaniciu et al. ......... 382/243 |
| 6,985,172 B1 * | 1/2006 | Rigney et al. .............. 348/149 |
| 2001/0033329 A1 | 10/2001 | Zhang et al. |
| 2002/0008758 A1 | 1/2002 | Broemmelsiek et al. |
| 2002/0028001 A1 | 3/2002 | Doi et al. |
| 2003/0197612 A1 * | 10/2003 | Tanaka et al. ........... 340/572.1 |
| 2004/0061781 A1 * | 4/2004 | Fennell et al. .............. 348/169 |
| 2004/0085440 A1 * | 5/2004 | Fennell et al. ................ 348/42 |
| 2004/0177053 A1 * | 9/2004 | Donoho et al. ............... 706/47 |
| 2004/0223054 A1 * | 11/2004 | Rotholtz ..................... 348/143 |
| 2004/0240542 A1 * | 12/2004 | Yeredor et al. ........ 375/240.01 |

OTHER PUBLICATIONS

"Detecting & Tracking Moving Objects for Video Surveillance", Isaac Cohen & Gerard Medioni, University of Southern California Institute for Robotics & Intelligent Systems, Jun. 23-25, 1999.

* cited by examiner

SCENE ANALYSIS SURVEILLANCE SYSTEM

BACKGROUND OF THE INVENTION

1. Technical Field

The present invention relates generally to video surveillance and more specifically to a method for evaluating entrants to a secured area for abnormal activity.

2. Description of the Prior Art

Security systems using video cameras are well-known in the art, and have been used extensively for decades. Such surveillance, however, is expensive, for while an automated system can easily record images, interpretation of these images is significantly more complex. It is thus necessary to have the output of the cameras reviewed by a human operator to detect abnormal situations. Where this manpower is unavailable, video footage has been useful mainly for investigation of a prior incident or for deterrence purposes.

As digital processing techniques have improved, other techniques have attempted to alleviate this need for human intervention. For example, a number of motion detection systems have been developed, requiring an operator to review only those images that show motion. This system can be useful for surveillance of a home or other areas with a relatively stable environment. A system relying on motion, however, suffers from a high frequency of false alarms. Events as trivial as the passage of animals through the monitored location or objects moved by a gust of wind can result in detected motion even when no abnormal condition exists.

Further, a motion detection system is ineffective in areas where the environment is not stable, where motion is common. One such location is a public building or park. In these areas, an operator is not interested in detecting every entrant to the area, but only those who may represent some threat to the area's security. It would be desirable to pre-evaluate entrants to a secured area to concentrate the attention of a human monitor on those entrants most likely to pose a threat to security.

SUMMARY OF THE INVENTION

To this end, a method is disclosed for analyzing video surveillance data from a plurality of video inputs recording entrants to a secured location. A plurality of entrant profiles are constructed, detailing typical attributes of the entrants, via data mining algorithms. Video inputs are analyzed with a plurality of independent automated decision-making systems, each determining if an abnormal condition exists based upon the constructed profiles. The determinations of the plurality of decision-making systems are then processed to determine if an alarm condition exists.

In accordance with another aspect of the invention, a computer program product, operative in a data processing system, is disclosed for analyzing video surveillance data from a plurality of video inputs recording entrants to a secured location. A data mining portion uses recorded information within a database to construct a plurality of profiles detailing typical attributes of the entrants. A plurality of independent automated decision-making systems each determine if an abnormal condition exists based upon the constructed profiles. An arbitrator processes the determinations of the plurality of decision-making systems to determine if an alarm condition exists.

BRIEF DESCRIPTION OF THE DRAWINGS

The foregoing and other features of the present invention will become apparent to one skilled in the art to which the present invention relates upon consideration of the following description of the invention with reference to the accompanying drawings, wherein.

DETAILED DESCRIPTION OF THE DRAWINGS

Figure 1:
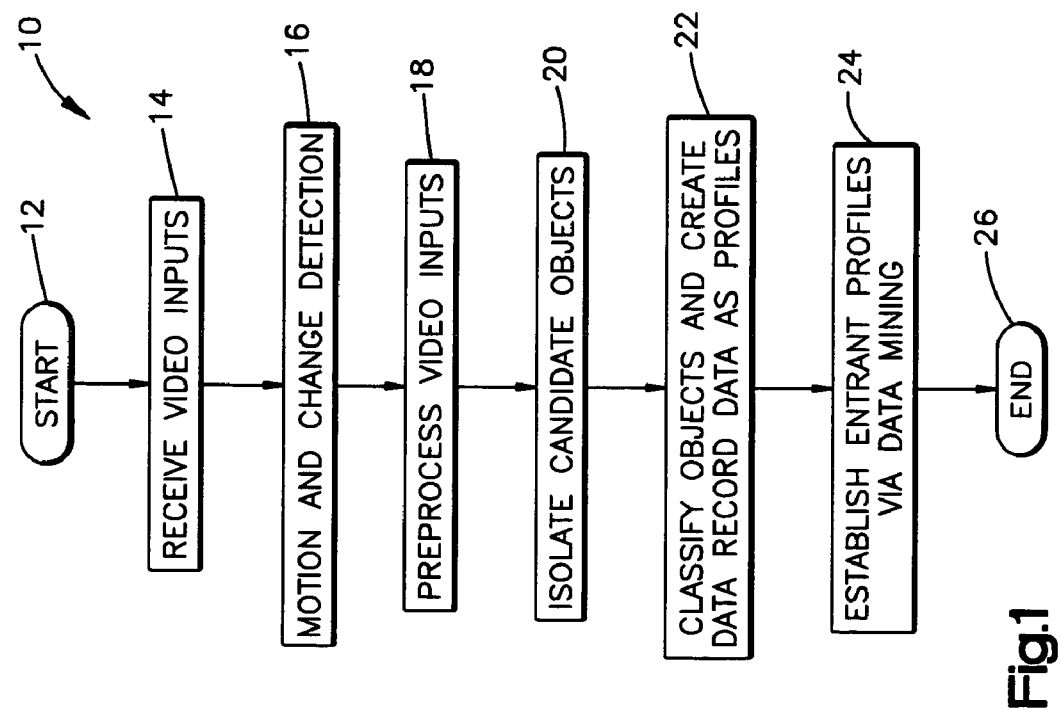
FIG. 1 illustrates a flow diagram illustrating the training stage of a surveillance system in accordance with one aspect of the present invention.

FIG. 1 illustrates a flow diagram illustrating the training stage of a surveillance system in accordance with one aspect of the present invention. The present invention tracks entrants into a secured location in an attempt to identify abnormal conditions related to an entrant based on a entrant profiles mined from a database. The training stage compiles the entrant profiles used by a set of decision-making systems within the present invention. The process 10 begins at step 12. The process then proceeds to step 14, where the system receives video input from a series of cameras. These video inputs are analyzed for motion and change over time at step 16.

Motion detection and change detection are well-known in the art, and these functions can be performed by any suitable method. The background of the video inputs can be removed as well prior to analysis, depending on the motion detection method used. General analysis of the scene will be performed as well, including a determination of the overall lighting level. Such a determination can be useful in determining extraneous factors that might influence an entrant's behavior, such as weather conditions.

Where motion is detected within a series of frames, temporal models of the motion are created for later analysis. In the example embodiment, this information can take the form of directed graphs of the motion across a map of the scene. Likewise, changes over a period of time within the image can be recorded as difference images. These images both provide useful information and aid in the detection of objects of interest. Images within series showing motion or change are passed on for further processing.

The process then proceeds to step 18, where the images within a motion series are separated into frames and pre-processed. During pre-processing, the images can be copied into alternative formats. For example, a grayscale image can be created from a color input. Alternatively, an input image might be downscaled to a smaller size to preserve space or aid certain classification analyses.

The process then proceeds to step 20, where the frame images are examined for candidate objects. Such candidate objects include potential faces, vehicles, and carried objects, such as bags or suitcases. This is accomplished according to several specialized algorithms, which vary according to the type of object being located. Once the objects are located, they are extracted from the image feature and saved as image files.

The process then passes to step 22, where the candidate objects are identified by one or more pattern recognition systems and saved into database records. On the basis of predefined features, the candidate objects are converted into a vector of numerical measurements, referred to as feature variables. This feature vector represents different aspects of the image in a compact form. Many feature types exist and are selected based on the characteristics of the recognition problem.

The extracted feature vector is then classified. The feature vector is related to the most likely output class of a plurality of predefined classes on the basis of a statistical analysis. This is accomplished by at least one classification system. Mathematical classification techniques convert the feature vector input to a recognition result and an associated confidence value. The confidence value provides an external ability to assess the correctness of the classification. For example, a classifier output can have a value between zero and one, with one representing maximum certainty.

If the detected object is a face, an initial classifier will first categorize the face according to several broad categories. For example, the face can be classified as an employee, a known visitor, or possibly a wanted criminal, depending on the information available to the system. One or more verification classifiers will attempt to match that face with a database of known faces. If this is accomplished, the information determined by the preliminary check is verified. The gathered information will be saved as a record for that individual, along with the time the image frame was captured, the number of people in the scene and the location of the camera. Where the classifier cannot recognize the face, a record will be created for the new face containing this information.

Where the candidate object is an item carried by an entrant, the system will attempt to identify the object from a number of object templates. These might include a purse, a briefcase, a box, various categories of suitcases and bags, or any similar class of commonly carried objects. Similarly, the system will identify classes of weapons and other dangerous objects. Information on carried objects will also be included in the record.

After the database records have been created, the program proceeds to step 24, where the database is mined to produce entrant profiles. Data mining, in this context, includes the automated review of one or more databases for information not usually available for common observation. A data mining algorithm sorts through data to identify previously unknown patterns and establish relationships that are of value for a particular task.

In the context of the present invention, reviewing the data for these common patterns allows the system to construct a profile of each entrant. This profile can list the items they typically carry, the range of times in which they normally enter or exit the building, and similar information. Likewise, the data mining will find other more general patterns, such as a tendency for entrants to carry umbrellas on overcast days or a tendency for employees to leave early on Fridays. These profiles and patterns will define a pattern of normal behavior for entrants. Once the profiles are established, the process terminated at step 26.

Figure 2:
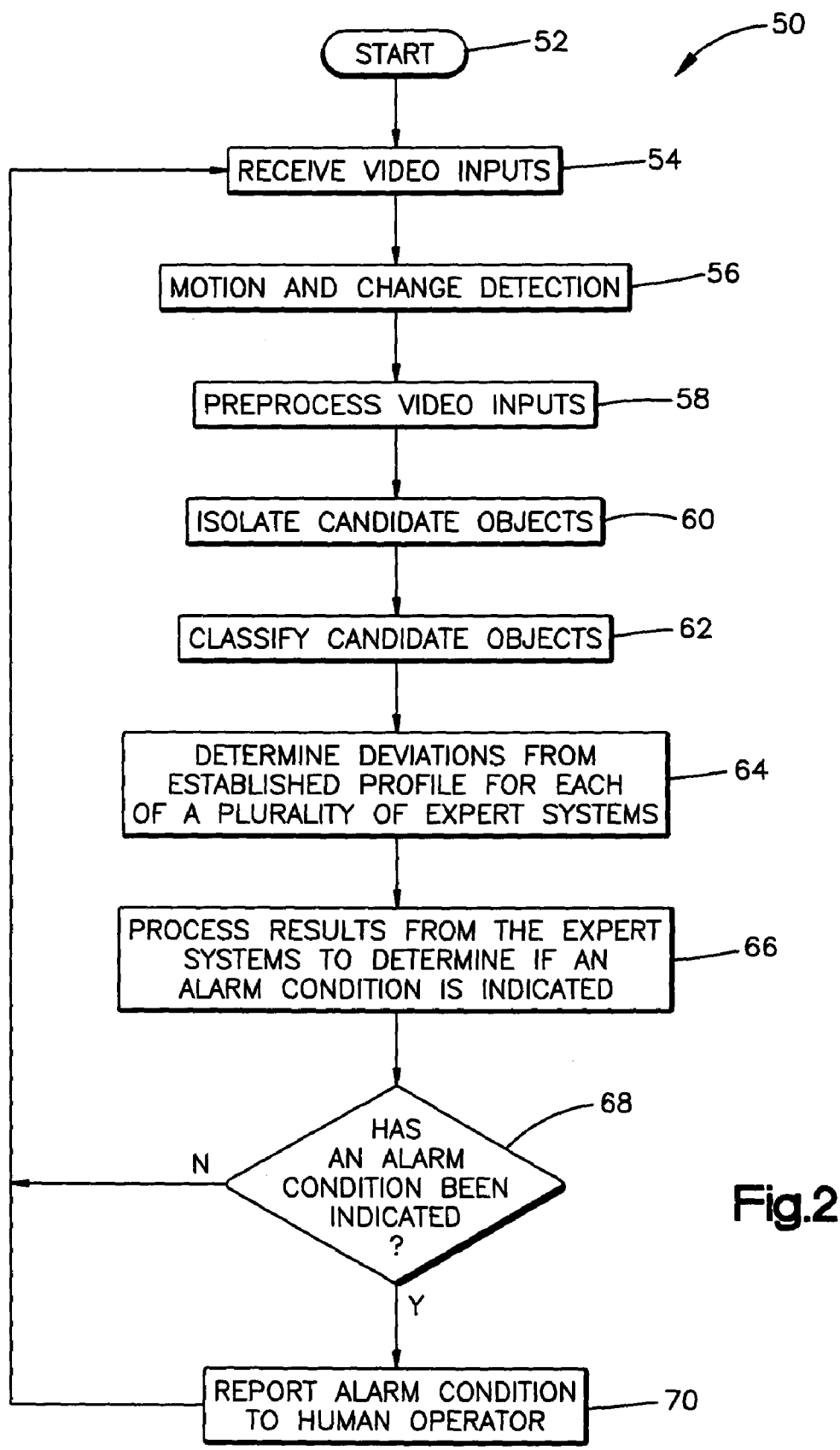
FIG. 2 illustrates a flow diagram illustrating the run-time operation of a surveillance system in accordance with one aspect of the present invention.

FIG. 2 illustrates the run-time operation of the present invention. The detection stage focuses on detecting abnormal activity according to the established profiles. The process 50 begins at step 52. At step 54, the system receives video input from a series of video cameras.

The process then proceeds to step 56, where the video input is analyzed for motion and changes. Where either is detected, the system retains a temporal map of the activity, as a directed map or difference image, for example, and the footage of the motion is saved for further analysis. At this stage, the background of the video input can be removed to aid in motion detection. General analysis of the scene will be performed as well, including a determination of the overall lighting level. Such a determination can be useful in determining extraneous factors that might influence an entrant's behavior, such as weather conditions.

The process then advances to step 58, where the saved footage is separated into individual frames and pre-processed. During pre-processing, the images can be copied into alternative formats. For example, a grayscale image can be created from color input. Alternatively, an input image might be downscaled to a smaller size to preserve space or aid certain classification analyses.

The process then advances to step 60, where the frame images are examined for candidate objects. Such candidate objects can include potential faces and carried objects. This is accomplished according to several specialized algorithms, which vary according to the type of object being located. Once the objects are located, they are extracted from the image and saved as image files.

The process then advances to step 62, where the candidate objects are classified. This step is similar to the classification of the training stage. Where a face is identified, the profile matching that face is retrieved. This profile will be used as a guide for the expert systems in their analysis. Where a face is detected, but cannot be identified, a generic profile can be retrieved.

The specific rules for handling unidentifiable entrants will vary between applications. Typically, a human operator will be notified of unidentified entrants, but this can vary with location, application, time of day, and/or any of the other factors discussed above. For example, in a private building, an operator may wish to be informed each time an unknown entrant comes into the building. In a public airport utilizing this notification system, however, the sheer volume of travelers who have not yet been profiled within the database would overwhelm an operator with notifications.

The process then proceeds to step 64, where the extracted information is provided to a plurality of automated decision-making systems for analysis. Each of these expert systems acts according to a specific set of rules to determine if the entrant's behavior deviates from the established profile. The expert systems can range from the very simple to the very complex.

For example, one system might determine abnormal behavior only if an object that the entrant is carrying is classified as a weapon. Another might incorporate a neural network classifier that translates the entrant's profile into a number of specific features and performs a statistical analysis to determine abnormality. A number of expert system frameworks are known in the art, and can be adapted for use in the present invention.

The process then continues to step 66, where the outputs of the expert systems are processed to determine if an alarm condition exists. In essence, the results of the various experts are arbitrated to make a final determination. This can be the result of selection among the results of the experts, or of a combination of the results.

For example, the final output of the system could be a threshold function receiving as its input a weighted average of the experts' outputs. Alternatively, the gating function could select an expert via yet another expert system that considers the input data and selects the output of an appropriate expert system based upon this input. In an example embodiment, the gating function or fuzzy system that determines a system response based upon the output of the expert systems.

The process then proceeds to a decision at step 68. If an alarm condition is not present, the system returns to step 54 to receive new video input. If an alarm condition is determined, the system advances to step 70, where the alarm condition is reported to a human operator. The system then returns to step 54 to receive further video input.

Figure 3:
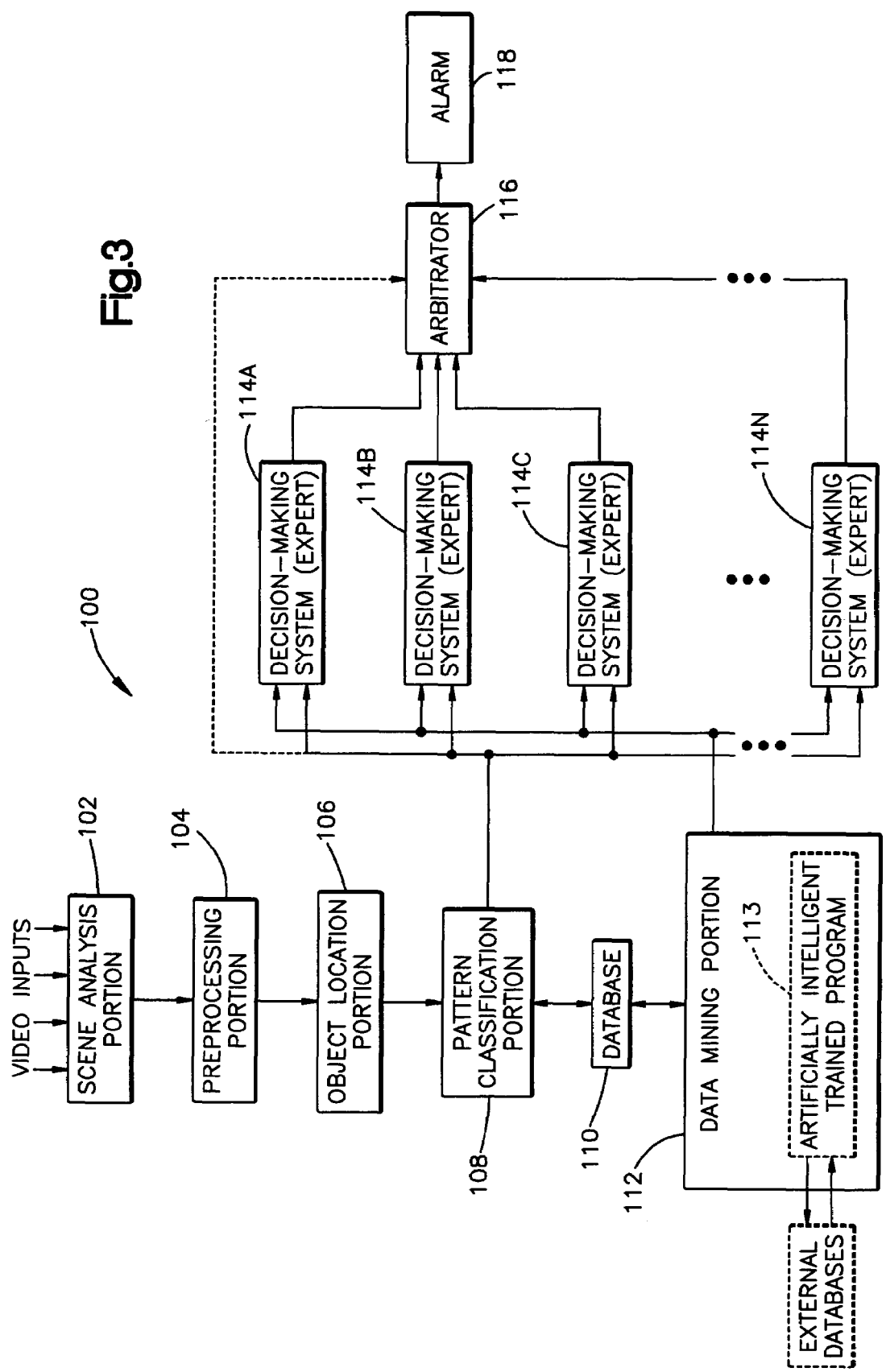
FIG. 3 illustrates a functional diagram of an example implementation of the present invention as a computer program product.

FIG. 3 is a functional block diagram of an example embodiment of the present invention. In the example embodiment, the video surveillance analysis system of the present invention is used to monitor the entry points of an airport. The system is intended to identify individuals showing characteristics considered abnormal based upon the possible established profiles.

The system 100 begins at a scene analysis portion 102. The scene analysis portion 102 receives inputs from a number of video cameras (not shown) located at entryways and other important locations within the secured area. For example, a camera can be trained on a ticket counter within the airport or at a boarding area. The scene analysis portion 102 analyzes the video footage for motion or long-term changes. Where either is found, the selected footage is passed to a preprocessing portion 104. The time of day, location, and lighting conditions are also determined from the captured footage. In the example embodiment, the motion tracking software also produces a directional graph of any motion on a map of the scene.

At the preprocessing portion 104, the video footage is separated into individual frames and sample frames are selected for processing. These sample frames are further prepared by producing alternate copies of the images, such as greyscale or binarized images to facilitate further analysis.

The preprocessed frames are then passed to the object location portion 106, where the frames are searched for objects of interest. In the example embodiment, objects of interest include faces, human forms weapons, and frequently carried objects, such as bags, suitcases, purses, or briefcases. The training portion 100 uses several specialized algorithms for this task.

For example, the example embodiment includes specialized segmentation algorithms for a body area of an individual, a hair area of an individual, and for any baggage carried by the individual. These segmentation algorithms, generally speaking, involve sub-sampling the color of the grayscale of the original image into an image of a lower compression. This sub-sampled image tends to have large contiguous areas that can be clustered. The algorithm looks for groupings of identical grayscale values and groups them together into runs. These runs of grayscale values are clustered into two-dimensional blocks.

Once these blocks have formed, the system uses the size, location, and aspect ratio of the blocks to divide them into hair, baggage, and body areas and sort them from the rest of the image. When a shape is detected resembling an object of interest, the portion of the image containing the shape is removed from the frame, saved as a separate file, and passed to a pattern classification portion 108.

The pattern classification portion 108 consists of a feature extractor and at least one pattern recognition classifier. In the example embodiment, a number of classifiers will be available, each specializing in particular types of candidate objects. For example, one classifier can identify faces within the image, another can identify objects, and a third may recognize alphanumeric characters as part of an object identification document. In the example embodiment, these classifiers can operate as a mixture of expert systems, with appropriate gating to process the outputs of the classifiers.

The feature extractor extracts feature values from each image according to a set of selected features. The selected features can be any values derived from the pattern that vary sufficiently among the various output classes to serve as a basis for discriminating among them. Numerical data extracted from the features can be conceived for computational purposes as a feature vector, with each element of the vector representing a value derived from one feature within the pattern. Features can be selected by any reasonable method, but typically, appropriate features will be selected by experimentation and prior success.

The extracted feature vector is then classified. During classification, the feature vector is compared to training data from a number of output classes. A variety of classifier architectures and techniques can be selected for making this determination. The classifiers attempt to match the feature vector to one of a plurality of represented classes using the selected classification technique. In this process, a class will be selected and a corresponding confidence measurement will be calculated.

During the training stage, once the objects are identified, their classification and the information collected by the scene analysis portion are recorded as an entry in the database 110. In the example embodiment, the entries will include information such as the time of day, the location at which the picture was taken, the number of people in the image, and the identities (if available) of these individuals and any objects they carry. An approximate height and weight of the individuals is also calculated at this stage.

Once a sufficient number of records become available in the database, a data mining portion 112 mines the gathered data for common patterns that may be useful in interpreting the behavior of entrants to a secured area. The data mining portion 112 develops profiles of normal behavior for persons identified by the pattern classification portion 108.

Thus, for each identifiable entrant, there can be a profile detailing the items he or she can be expected to carry, a range of times when he or she typically enters or leaves the secured area, and a list of entrances the person typically uses. These profiles can be extremely detailed, matching behavior with the time and day of the activity, the location, and even the detected weather patterns.

For example, in the example embodiment, it may be normal for a particular employee to leave for one hour around lunchtime every Thursday by a particular entrance. The entrant's profile would reflect this habit. In addition, the data mining algorithms will look for patterns among the data not directly related to an individual entrant. Thus, it may be discovered that unidentifiable persons (i.e. visitors) are less common on Fridays than on other days or that entrants commonly carry umbrellas on overcast days.

In an alternate embodiment, the data mining portion 112 will include an artificially intelligent trained program 113 that will conduct searches of external databases to update the pattern classification portion 108 and add information to the entrant profiles. For example, the trained program 113 might periodically search an Internet webpage listing wanted criminals to add images of the criminals as output classes. In this alternate embodiment, profiles can be created for potential entrants who were not recorded by the classification system.

The profiles and correlations established by the data mining portion are used to train a plurality of expert decision-making systems 114A-114N. Many different expert systems can be adapted to the present invention, including neural network and statistical classifiers, image analysis systems that can interpret temporal models and directional graphs formed by the scene analysis portion, and case-based reasoning techniques. The information from the data mining portion 112, is placed in an acceptable form for each decision-making system, and the systems are trained on the provided data. At this point, the system is ready for run-time operation.

During run-time operation, the cameras continue to capture video images, which are analyzed at the scene analysis portion 102 as discussed above. Similarly, samples of individual frames continue to be preprocessed and scanned for candidate objects. During run-time operation, however, the classification result for the candidate objects from the pattern classification portion 108 are provided to the plurality of decision-making systems, along with the information recorded at the scene analysis portion.

The decision-making systems 114A-114N, each determine from the inputted data if an abnormal condition exists based upon the profiles provided by the data mining portion 112. The operation of the experts will vary, depending on the application. In an example implementation, one system might include an image analysis system that analyzes a model of temporal change provided by the scene analysis portion 102. By examining this model, it would be possible to detect signs of missing objects or moved vehicles within the confines of the image.

A second system might include a neural network, trained to recognize certain types of deviations from the entrant profiles as abnormal. The generalization of the training data common to neural networks will allow the network to recognize similar untrained deviations as abnormal activity, while ignoring minor deviations from the profile. The determinations of the decision-making systems 114A-114N are encoded in a system output, which can include the determination of the system and a calculated confidence value.

In the example embodiment, the decision-making systems 114 include several specially trained classifiers. An initial face matching classifier is included, along with at least one verification classifier. Face matching is an important part of the system, and proper, high-confidence determination requires a determination by multiple independent classifiers. In the example embodiment, the initial classifier makes a preliminary determination as to the class to which the entrant belongs, either a known traveler, an employee of the airport or an airline, or a known criminal. This initial classification is verified by three verification classifiers that confirm the identity, and thus the class, of the individual.

A bag matching classifier is included as well, to determine the type of bag carried by the entrant. A second baggage classifier will attempt to identify bags and suitcases as suspect or not suspect. This classification simply provides guidance as to the types of bags and suitcases that could conceal dangerous items. While no classifier can make a sure determination as to the contents of baggage, the output of the second baggage classifier is factored into an overall determination of the suspiciousness of an individual. This determination would also be application specific. For example, carrying a large suitcase into an airport is clearly a normal activity; carrying the same suitcase into an office building is unusual.

Another type of classifier determines the number of people at a particular location, such as at a ticket counter or in line for boarding. An expert system can estimate the height and weight of an entrant and compare it to a presented identification card or a known height and weight of the individual identified in the face recognition portion. The above listed classifiers are only exemplary, and should not be taken as an exhaustive list of the decision-making systems found within the video surveillance system 100. One skilled in the art will appreciate that a number of other expert decision-making systems will be useful in analyzing entrant behavior.

The outputs of the decision-making systems 114A-114N are passed to an arbitrator 116. The arbitrator 116 processes the determinations of the decision-making systems to produce a single system output. The arbitrator 116 can produce this single system output via any of several processes. In one embodiment, the arbitrator selects one of the outputs as the system output on the basis of some independent determination.

For example, the arbitrator 116 can include a neural network that is trained to select one of the decision-making systems 114A-114N as the best authority for the present determination based upon the input data provided to the decision-making systems 114A-114N. In such a case, the arbitrator 116 would also receive the input data from the pattern classification portion. This input is shown as a broken line in FIG. 3, as the example embodiment does not make use of such a system. Alternatively, the arbitrator 116 could combine the outputs of the decision-making systems 114A-114N into a single system output. In the example embodiment, the outputs of the decision-making systems 114A-114N are provided to a fuzzy logic system that produces the single system output.

In an alternate embodiment, the single system output is a weighted linear combination of the outputs of the decision-making systems 114A-114N. The output of each classifier is converted to a numerical value based upon the selected output class of the classifier and the confidence value of the classification.

For example, if the classifiers cannot recognize an individual's face, it might output a small value or zero. Where the face is recognized as an employee, a moderately large positive value can be outputted. The other expert systems operate in a similar fashion, with low or negative scores awarded for output classes indicating an abnormal condition. These values are multiplied by predetermined weights and summed to achieve a score.

The weights will vary with the application, but generally the results from the face recognition classifier will be heavily weighted as compared to the other experts. In a similar vein, results concerning features that are easily mutable, such as hair color will be lightly weighted. The intention of summing the scores in this manner is to discourage false positive and false negative matches in the individual recognition systems.

The summed output can be evaluated on a scale having multiple thresholds. An individual who scored above a first threshold value could be considered to be a non-threat by the system, while an individual scoring below a second threshold value may trigger an alarm condition within the system. An individual scoring between the two threshold values will be considered a possible threat, and can trigger an alarm condition of a reduced level.

The thresholds can be set as to allow the mistaken output of any one expert system to be overridden by the outputs of the other systems. For example, even where an individual's face is not recognized, the first threshold is set such that an individual who does not trigger an output indicating an abnormal situation in the other classifiers can obtain a score meeting the first threshold. Thus, an unrecognized individual whose height, weight, and hair color match his or her ID and who is not carrying anything suspicious might meet the first threshold.

The output of the arbitrator is provided to the alarm 118. The alarm 118 controls the system response to an abnormal condition. Generally, the alarm will merely produce a visible or audible signal to a human operator indicating the video surveillance camera recording the abnormal activity. In a particularly sensitive secured area, the alarm 118 can notify operators who are not on the scene or produce a generally audible alarm signal.

Multiple levels of response are possible, where the arbitrator 116 determines a level of threat, and the response of the alarm 118 depends upon this level of threat. In the example embodiment, where an individual's score falls below the second threshold, an operator can be notified by both a visible and an audible alarm, or the system might trigger further security involvement and surveillance. A score falling between the two thresholds might result merely in a text notification appearing at a computer monitor.

Figure 4:
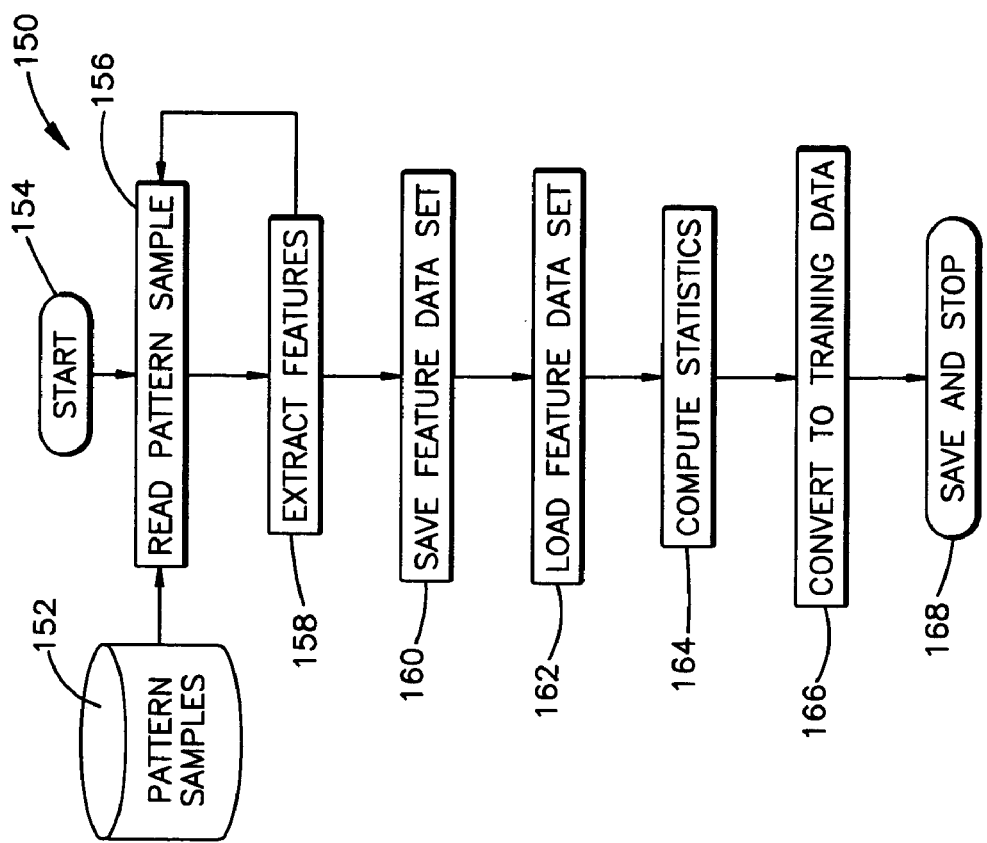
FIG. 4 is a flow diagram illustrating a training process for a statistical pattern recognition classifier compatible with the present invention.

FIG. 4 is a flow diagram illustrating the training of a statistical pattern recognition classifier implemented as a computer program in the prior art. Such a classifier can be used as an expert decision-making system in the present invention. It should be noted that the described process is exemplary in nature, and the training of other decision-making systems can vary greatly from the described process.

The process 150 requires a number of samples 152 to be generated from the entrant profiles collected by the data mining portion. The number of output classes, the selected features, and the nature of the classification technique used directly affect the number of samples needed for good results for a particular classification system. While the use of too few images can result in an improperly trained classifier, the use of too many samples can be equally problematic, as it can take too long to process the training data without a significant gain in performance.

The actual training process 150 begins at step 154 and proceeds to step 156. At step 156, the program retrieves a sample from memory. The process then proceeds to step 158, where the pattern sample is converted into a feature vector input similar to those a classifier would see in normal run-time operation. After each sample feature vector is extracted, the results are stored in memory, and the process returns to step 156. After all of the samples are analyzed, the process proceeds to step 160, where the feature vectors are optionally saved to a physical storage medium as a set.

The actual computation of the training data begins in step 162, where the saved feature vector set is retrieved from memory. After retrieving the feature vector set, the process progresses to step 164. At step 164, the program calculates statistics, such as the mean and standard deviation of the feature variables for each class. Statistics about the relationship between the variables can also be calculated, including a covariance matrix of the sample set for each class. The process then advances to step 166 where it uses the set of feature vectors to compute the training parameters. At this step in the example embodiment, an inverse covariance matrix is calculated, as well as any fixed value terms needed for the classification process. After these calculations are performed, the process proceeds to step 168 where the training parameters are stored in memory and the training process ends.

It will be understood that the above description of the present invention is susceptible to various modifications, changes and adaptations, and the same are intended to be comprehended within the meaning and range of equivalents of the appended claims. The presently disclosed embodiments are considered in all respects to be illustrative, and not restrictive. The scope of the invention is indicated by the appended claims, rather than the foregoing description, and all changes that come within the meaning and range of equivalence thereof are intended to be embraced therein.

We claim:

1. A method of analyzing video surveillance data from a plurality of video inputs recording entrants to a secured location, comprising:
    constructing a plurality of entrant profiles, detailing typical attributes of the entrants, via data mining algorithms;
    analyzing video inputs, with a plurality of independent automated decision-making systems each determining if an abnormal condition exists based upon the constructed profiles; and
    processing the determinations of the plurality of decision-making systems to determine if an alarm condition exists.

2. A method as set forth in claim 1, wherein the method further includes the step of identifying objects within the video inputs and recording this information as part of the entrant profiles.

3. A method as set forth in claim 1, wherein the secured area is a building, and at least one of the plurality of video inputs record an area adjacent to one of the entrances to the building.

4. A method as set forth in claim 3, wherein the secured area is an airport.

5. A method as set forth in claim 1, wherein the plurality of decision-making systems includes a neural network classifier.

6. A method as set forth in claim 1, wherein at least one of the plurality of decision-making systems interprets a temporal model of the video input extracted over a plurality of video frames.

7. A method as set forth in claim 1, wherein the step of processing the determinations of the decision-making systems includes combining a plurality of outputs of the decision-making systems into a single system output.

8. A method as set forth in claim 7, wherein the single system output is a weighted linear combination of the outputs of the plurality of decision-making systems.

9. A method as set forth in claim 1, wherein the step of processing the determinations of the decision-making systems includes selecting one of the plurality of decision-making systems and accepting its determination.

10. A method as set forth in claim 9, wherein the selection of one of the decision-making systems is performed by an independent neural network.

11. A computer program product, embodied in a computer readable medium that stores computer executable instructions, for analyzing video surveillance data from a plurality of video inputs recording entrants to a secured location, the executable instructions comprising:
    a data mining portion that uses recorded information within a database to construct a plurality of profiles detailing typical attributes of the entrants;
    a plurality of independent automated decision-making systems, each determining if an abnormal condition exists based upon the constructed profiles; and
    an arbitrator that processes the determinations of the plurality of decision-making systems to determine if an alarm condition exists.

12. A computer program product as set forth in claim 11, wherein the entrant profiles include the typical time of entry and place of entry by an entrant to the building.

13. A computer program product as set forth in claim 11, wherein the computer program product further includes at least one pattern recognition classifier that identifies objects within the video inputs and records this information within the database.

14. A computer program product as set forth in claim 13, wherein the number of people present in an image is included in the recorded information within the database.

15. A computer program product as set forth in claim 13, wherein the entrant profiles include items typically carried by the entrant.

16. A computer program product as set forth in claim 11, wherein the arbitrator is a fuzzy logic system.

17. A computer program product as set forth in claim 11, wherein the system includes an alarm that notifies a human operator when an alarm condition exists.

18. A computer program product as set forth in claim 17, wherein the alarm recognizes at least two levels of alarm condition, such that the alarm notifies a human operator at the first level of alarm condition and sounds a generally audible alarm at the second level of alarm condition.

19. A computer program product as set forth in claim 11, wherein the data mining portion includes an artificially intelligent trained program that retrieves information from external data sources.

20. A computer program product as set forth in claim 19, wherein the external data sources include at least one preselected Internet web page.

* * * * *